United States Patent [19]

Hyde et al.

[11] 4,077,637

[45] Mar. 7, 1978

[54] CERAMIC COATED PISTON RINGS

[75] Inventors: Glenn F. Hyde, Timonium; Thomas W. Alban, Glen Burnie, both of Md.

[73] Assignee: Koppers Company, Inc., Pittsburgh, Pa.

[21] Appl. No.: 759,841

[22] Filed: Jan. 17, 1977

[51] Int. Cl.$^2$ ............... B05B 7/22; F16J 9/00
[52] U.S. Cl. ................. 277/235 A; 427/34; 29/156.6
[58] Field of Search ........... 277/216, 223, 224, 235 A, 277/235 R, 96 A; 29/156.6; 427/34, 423

[56] References Cited

U.S. PATENT DOCUMENTS

| | | | |
|---|---|---|---|
| 3,310,423 | 3/1967 | Ingham | 427/423 X |
| 3,481,715 | 12/1969 | Whalen et al. | 277/235 A X |
| 3,607,343 | 9/1971 | Longo et al. | 427/423 X |
| 3,697,091 | 10/1972 | Prasse et al. | 277/235 A |
| 3,890,070 | 6/1975 | Sasame et al. | 277/235 A X |
| 3,927,223 | 12/1975 | Takabatake et al. | 427/34 |
| 3,938,814 | 2/1976 | Cromwell | 427/34 X |
| 3,941,903 | 3/1976 | Tucker | 427/423 X |

FOREIGN PATENT DOCUMENTS 2,227,140  11/1974  France .................. 427/34

Primary Examiner—Robert S. Ward, Jr.
Attorney, Agent, or Firm—Thomas L. Sivak; Oscar B. Brumback

[57] ABSTRACT

Piston rings for internal combustion engines having the bearing face plasma sprayed with a superior scuff and wear resistant material. The bearing surface of the rings is plasma jet sprayed with a bond coat comprised of nickel, chromium and aluminum and a scuff and wear resistant coating of aluminum oxide, titanium dioxide and ferric oxide.

4 Claims, 2 Drawing Figures

CERAMIC COATED PISTON RINGS

BACKGROUND OF THE INVENTION

1. Field of Invention

This invention relates to piston rings for use in internal combustion engines. More particularly, it relates to piston rings for use in high speed, high power diesel engines having the bearing face plasma jet sprayed with a bond coat of nickle-chromium and aluminum powder and a scuff and wear resistant coating comprised of aluminum oxide, titanium dioxide and ferric oxide.

2. Description of the Prior Art

Piston rings, including compression rings and the like, are coated on their bearing faces to enhance their performance characteristics. As diesel engines having higher power and speeds are coming into service it is important that a coating be found which exhibits the desired characteristics of durability, wear and scuff resistance.

Chromium plated rings are known in the art and have been used successfully in diesel engines for many years. However, chromium plating is relatively expensive especially in relation to the scuff and wear resistance properties. Certain other art coatings have exhibited either good scuff or wear resistance but not both properties. U.S. Pat. No. 3,697,091 discloses a coating comprised essentially of a mixture of aluminum oxide and titanium dioxide in specified percentages by weight. Although the coating disclosed in U.S. Pat. No. 3,697,091 did exhibit a certain degree of good wear and scuff resistance in tests, it is believed that these compositions do not exhibit the superior qualities demonstrated by the compositions of the present application. Further, it does not appear that the compositions of U.S. Pat. No. 3,697,091 have found commercial acceptance.

SUMMARY OF THE INVENTION

The present invention provides a coating for piston rings which demonstrates both a high degree of wear and scuff resistance. The present invention is also more economical than present commercially used chromium plating.

The foregoing is accomplished by plasma jet spraying a first bond coating to the bearing face of a piston ring formed from centrifically cast ductile iron. The iron is properly heat treated and machined to form it into a split ring having a circumferential groove cut into its bearing face. The bonding coat is a nickle-chromium powder with a trace of aluminum particles. The bond coat is applied to a thickness of approximately 0.001-.002 inch by a plasma gun. The plasma gun utilizes a nitrogen-hydrogen fuel gas and the bonding coat powder is conveyed from a hopper by means of a stream of nitrogen gas. The powder is deposited as an in situ formed coating. The wear and scuff resistant coating is now applied by the plasma gun. The wear and scuff resistant coating is preferably a mixture comprised 91-95 percent aluminum oxide, 0-5 percent titanium dioxide and 0-4 percent ferric oxide. The scuff and wear resistant coat sprayed to a thickness of approximately 0.017 inch onto the bonding coat. The ring is then ground by a diamond bonded wheel to remove a small amount of coating and expose the shoulders of the bearing face of the ring. The coating is then lapped to its final thickness by boroncarbide abrasive which finally forms the ring and shapes the coating to a crown. Rings coated with the present invention have demonstrated a reduction in liner wear of the cylinder of 50 percent of that achieved with coatings of the prior art.

DESCRIPTION OF THE PREFERRED EMBODIMENT

Figure 1:
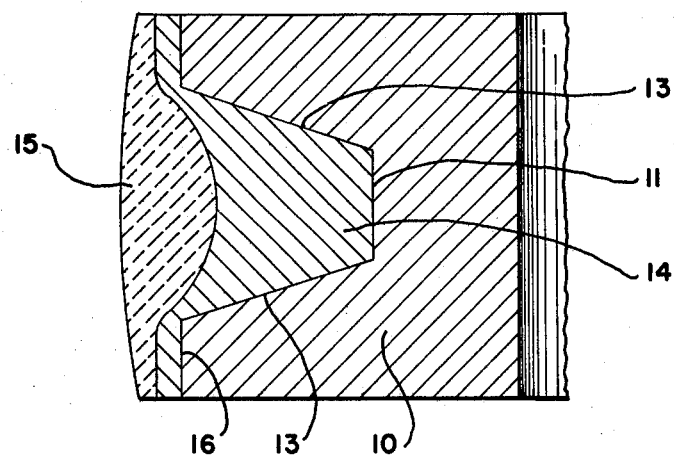
FIG. 1 is an enlarged fragmentary cross-sectional view of a compression ring coated in accordance with the present invention.
Figure 2:
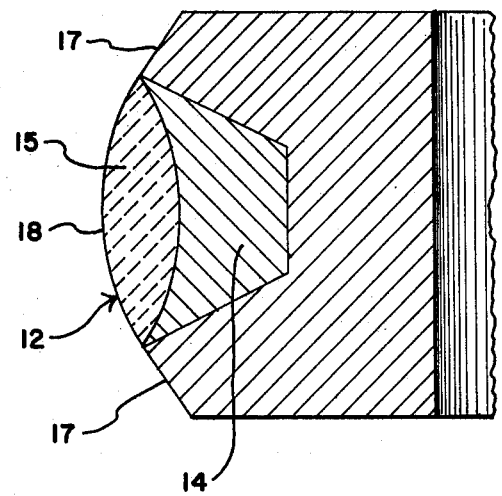
FIG. 2 is an enlarged fragmentary cross-sectional view of a compression ring coated in accordance with the present invention showing the finished bearing face of the ring.

FIG. 1 illustrates a cross-sectional view of a typical compression ring 10 in which circumferential groove 11 has been cut by a cutting tool while the ring was mounted on an arbor (not shown). Ring 10 has a bearing face 12 and groove faces 13. The groove faces are cut at an angle of 55° from the vertical. Ring 10 is made from centrifically cast ductile iron which has been malliablized to remove hard sports such as iron carbides. The ring is also austemitized in a salt bath treatment at 1550° F. and then quenched in a second salt bath solution at 400° F. The ring is then tempered to a hardness of 40-46 on the Rockwell C Scale in an air furnace. Ring 10 also undergoes certain cutting operations whereby the final dimensions are secured and a slot is cut in the ring to form the split ring. Also, groove 11 is cut into the ring to a depth of .018 inch by means well known in the art. Many of the operations heretofore described, such as the cutting of groove 11, are performed while ring 10 and a plurality of others like it are mounted on an arbor (not shown). When referring to ring 10 herein, it is understood that in the preferred embodiment the ring is mounted with similar rings on the arbor during the plasma spraying operation.

Prior to the plasma spraying, ring 10 is thoroughly degreased and subjected to a grit blast to eliminate visible shiny spots. An aluminum oxide size 60 grit is used, pressure 80-90 psi, at a gun to work distance of 3 to 4 inches. The ring is then preheated by the plasma gun to 250°-300° F. The ring is now prepared for the application of the bond and scuff and wear rsistant coating. It will be understood that the operation of the plasma gun is well understood by those skilled in the art and the details of its operation or construction will not be explained in detail here.

In the preferred embodiment the bond coating is now applied to the bearing face 12 of ring 10. The bond coating is nickle-chromium which is 80% nickle, 20% chromium and 6% aluminum bonded thereto. The bond coating 14 is applied to a thickness of .001 to .002 inch. Nitrogen and hydrogen are used as the plasma gas at 70 to 80 volts, 400 amps and 28 to 32 Kw. The bond coat is initially a powder and is conveyed to the gun from a hopper, not shown, by a stream of nitrogen gas. After the bond coat is applied, the ceramic material is applied. The ceramic material is a powder comprised of 94% aluminum oxide $Al_2O_3$, 3% titanium dioxide $TiO_2$ and 3% ferric oxide $Fe_2O_3$. Nitrogen and hydrogen are used as the plasma gas at 70 to 80 volts, 600 amps and 45-50 Kw. The coating powder is conveyed to the gun from a hopper, not shown, again by a stream of nitrogen gas. The scuff and wear resistant coating 15 is applied to a depth of approximately .017 inch. As understood in the art, the very high velocity and temperature of the plasma gas are imparted to the bond coat powder and the coating powder so they strike the base material of the ring in the case of the bond coat and the bond coat in the case of the coating and are effectively welded to the surface. The hardness of the scuff and wear resis-coating is approximately R15N 92-96; the micro hardness is on the order of 1000-1300 DPH-100; the tensile and bond strength of the coating approximately 5500 psi.

After the scuff and wear resistant coating is applied, it is ground by a diamond bonded wheel to a flat configuration which exposes shoulders 16 of bearing face 12 of ring 10. After shoulders 16 are exposed, ring 10 is mounted on a piston, not shown, in a cylindrical lapping barrel. The operation of the lapping barrel is well understood in the art. The action of the lapping barrel causes a bevel 17 in shoulders 16 and forms a crown 18 on the scuff and wear resistant coating. This lap forms the final thickness of the coating. The lap is by boron-carbide, 800-1000 grit size.

The piston ring of the present invention demonstrates superior scuff and wear resistance while being economical to manufacture.

What is claimed is:

1. A piston ring having a scuff and wear resistant coating comprised of 91-95 percent aluminum oxide, 0-5 percent titanium dioxide and 0-4 percent ferric oxide by weight, said scuff and wear resistant coating being plasma sprayed on said piston ring.

2. The piston ring of claim 1 wherein a nickle-chromium aluminum bond coat is plasma sprayed on said ring to underlay said coating.

3. The piston ring of claim 2 wherein said coating consists of 94 percent aluminum oxide, 3 percent titanium dioxide and 3 percent ferric oxide.

4. The piston ring of claim 3 wherein said bond coat consists of 80 percent nickle, 20 percent chromium with approximately 6 percent aluminum bonded thereto by weight.

* * * * *